US012651111B2

(12) United States Patent
Cheng et al.

(10) Patent No.: US 12,651,111 B2
(45) Date of Patent: Jun. 9, 2026

(54) PAGE DISPLAY METHOD, APPARATUS, ELECTRONIC DEVICE AND STORAGE MEDIUM

(71) Applicant: BEIJING ZITIAO NETWORK TECHNOLOGY CO., LTD., Beijing (CN)

(72) Inventors: Tao Cheng, Beijing (CN); Long Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 256 days.

(21) Appl. No.: 18/621,647

(22) Filed: Mar. 29, 2024

(65) Prior Publication Data

US 2024/0330566 A1 Oct. 3, 2024

(30) Foreign Application Priority Data

Mar. 30, 2023 (CN) .......................... 202310332554.0

(51) Int. Cl.
  *G06F 40/106* (2020.01)
  *G06F 40/205* (2020.01)
(52) U.S. Cl.
  CPC .......... *G06F 40/106* (2020.01); *G06F 40/205* (2020.01)

(58) Field of Classification Search
  CPC ...... G06F 40/106; G06F 40/205; G06F 40/14; G06F 9/451; G06F 8/41; G06F 16/957; G06F 16/958
  See application file for complete search history.

(56) References Cited

U.S. PATENT DOCUMENTS

| | | | | |
|---|---|---|---|---|
| 9,639,517 B2 * | 5/2017 | Horiuchi | ............... | G06F 40/186 |
| 2012/0110433 A1 * | 5/2012 | Pan | ........................ | G06F 40/103 |
| | | | | 715/234 |
| 2020/0195705 A1 * | 6/2020 | Liu | ........................ | H04L 67/02 |
| 2022/0253588 A1 * | 8/2022 | Sun | ........................ | G06F 40/154 |
| 2024/0362293 A1 * | 10/2024 | Huang | .................. | G06F 40/205 |

FOREIGN PATENT DOCUMENTS

| | | | | |
|---|---|---|---|---|
| CN | 107656759 A | | 2/2018 | |
| CN | 111752667 A | * | 10/2020 | ............. G06F 9/451 |

* cited by examiner

*Primary Examiner* — Jeanette J Parker
(74) *Attorney, Agent, or Firm* — Alleman Hall LLP

(57) ABSTRACT

Embodiments of the present disclosure provide a page display method, apparatus, electronic device, and storage medium, comprising acquiring a layout file of a target page, which is used to characterize a page layout of the target page; according to the layout file, obtaining view data of the target page, which is used to characterize view attributes of view objects within the target page; based on the view data, asynchronously generating a target view tree corresponding to the target page via at least two processing threads; and displaying the target page based on the target view tree.

17 Claims, 6 Drawing Sheets

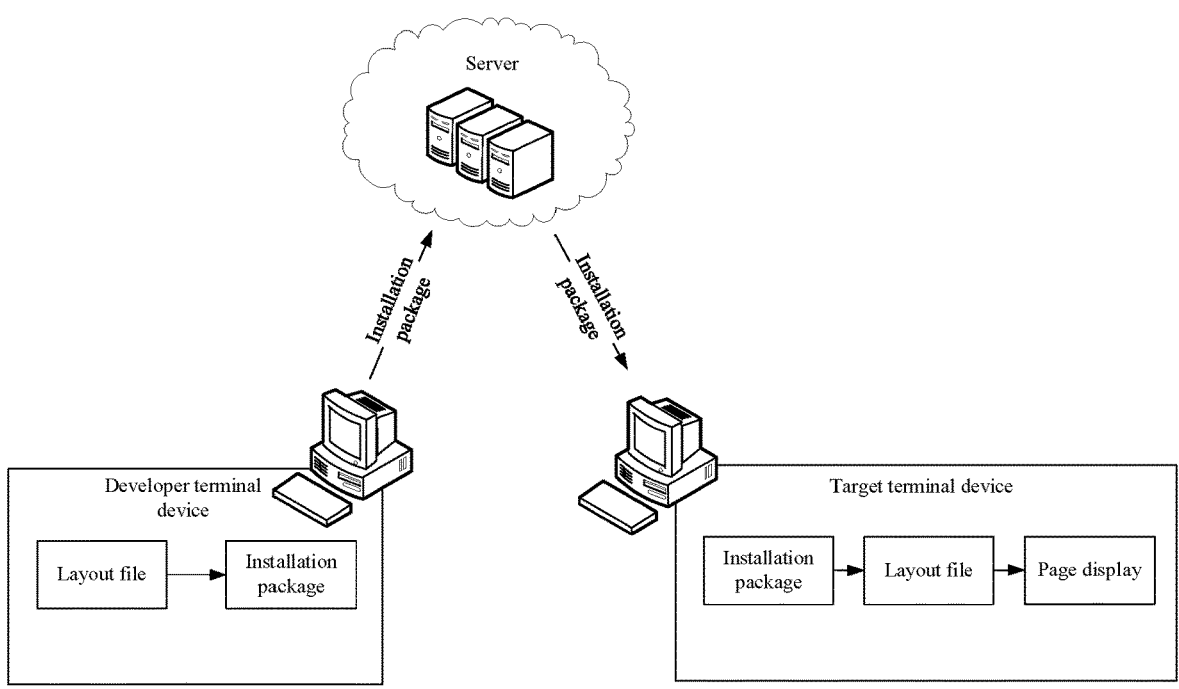

FIG. 1

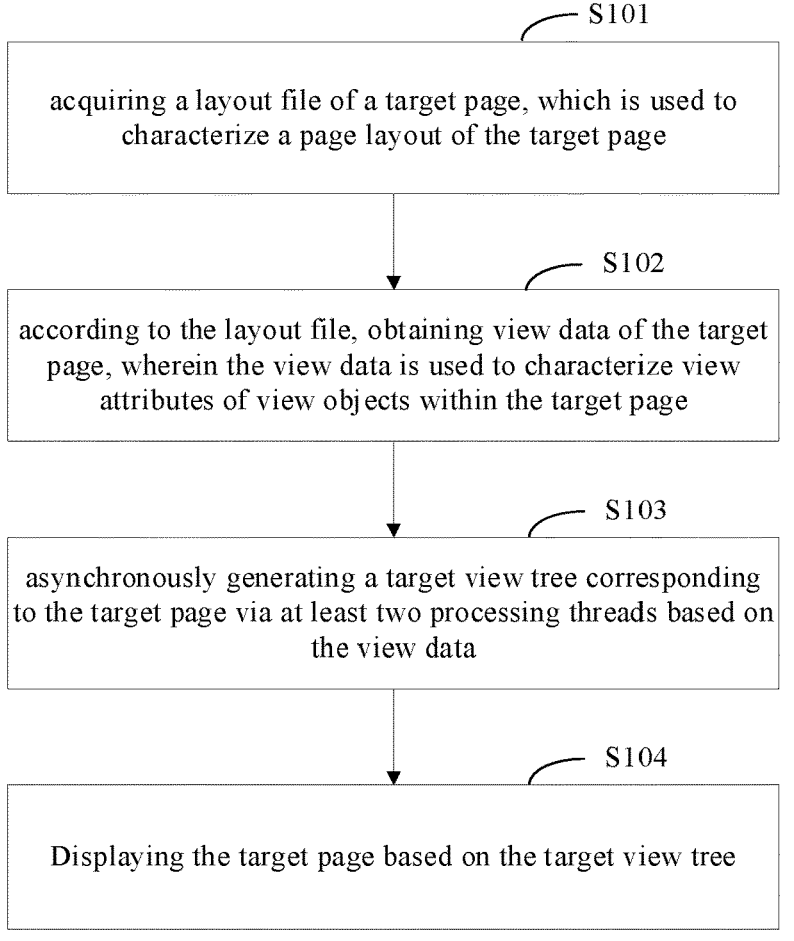

S101 acquiring a layout file of a target page, which is used to characterize a page layout of the target page

S102 according to the layout file, obtaining view data of the target page, wherein the view data is used to characterize view attributes of view objects within the target page

S103 asynchronously generating a target view tree corresponding to the target page via at least two processing threads based on the view data

S104

Displaying the target page based on the target view tree

FIG. 2

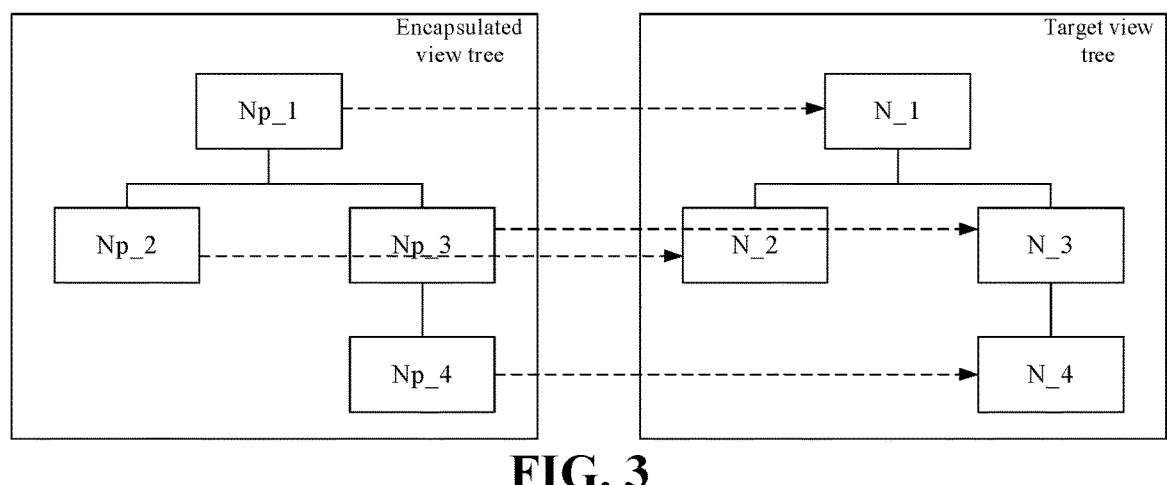

FIG. 3

S1021 acquire a parsing tool corresponding to the layout file

S1022 based on the parsing tool, performing file compiling on the layout file to obtain the view data of each view object

FIG. 4

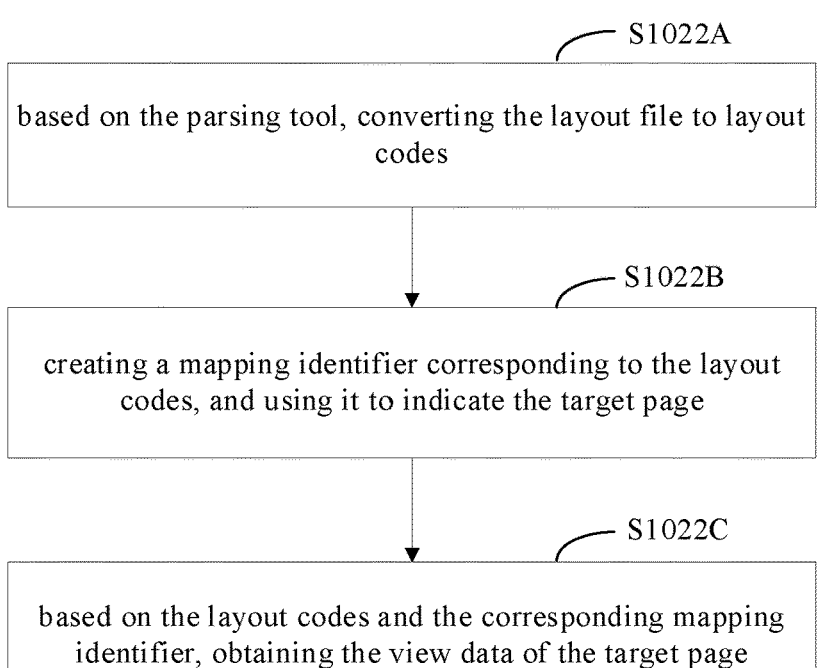

S1022A based on the parsing tool, converting the layout file to layout codes

S1022B creating a mapping identifier corresponding to the layout codes, and using it to indicate the target page

S1022C based on the layout codes and the corresponding mapping identifier, obtaining the view data of the target page

FIG. 5

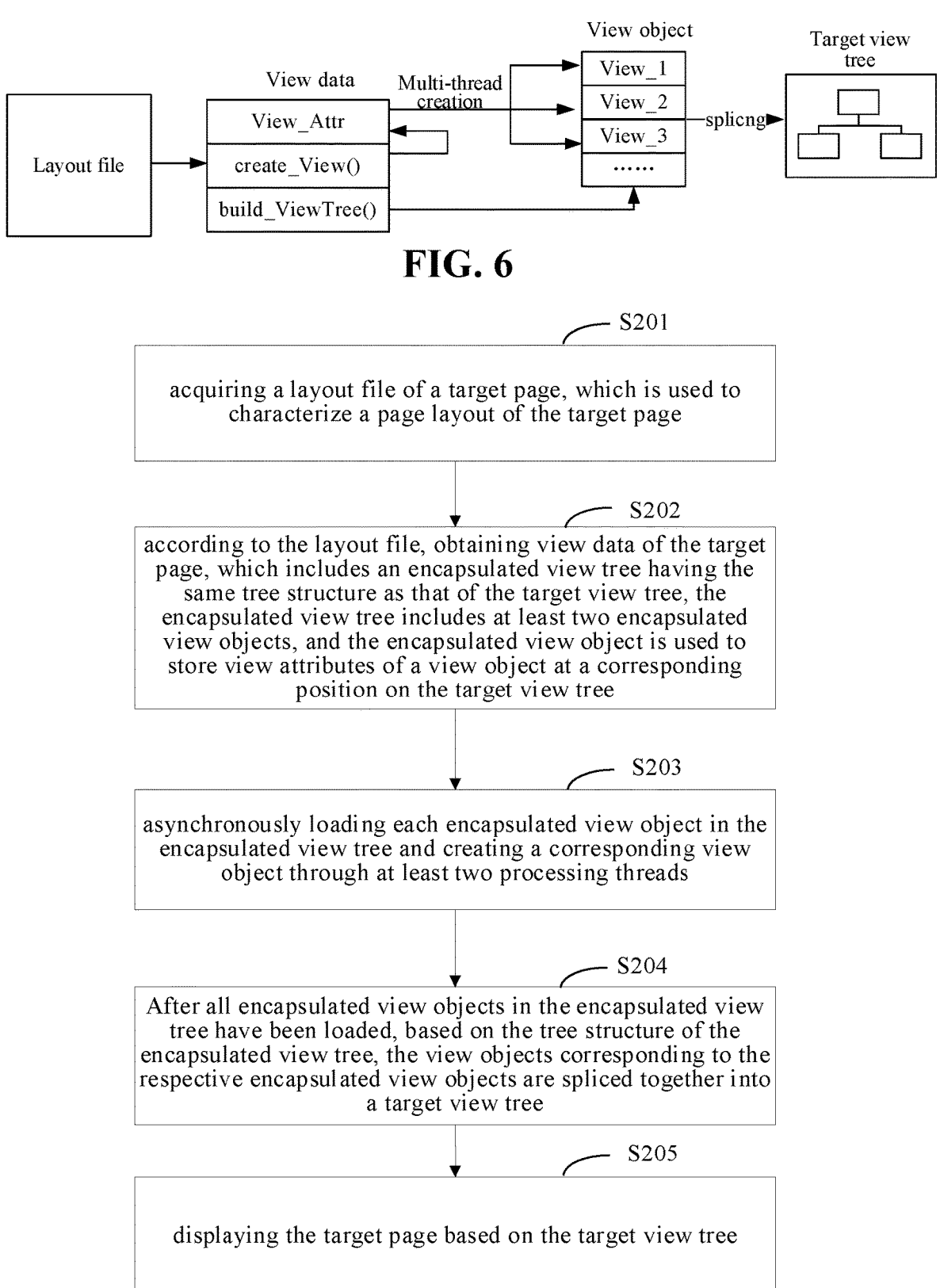

FIG. 6

S201 acquiring a layout file of a target page, which is used to characterize a page layout of the target page

S202 according to the layout file, obtaining view data of the target page, which includes an encapsulated view tree having the same tree structure as that of the target view tree, the encapsulated view tree includes at least two encapsulated view objects, and the encapsulated view object is used to store view attributes of a view object at a corresponding position on the target view tree

S203 asynchronously loading each encapsulated view object in the encapsulated view tree and creating a corresponding view object through at least two processing threads

S204

After all encapsulated view objects in the encapsulated view tree have been loaded, based on the tree structure of the encapsulated view tree, the view objects corresponding to the respective encapsulated view objects are spliced together into a target view tree

S205 displaying the target page based on the target view tree

FIG. 7

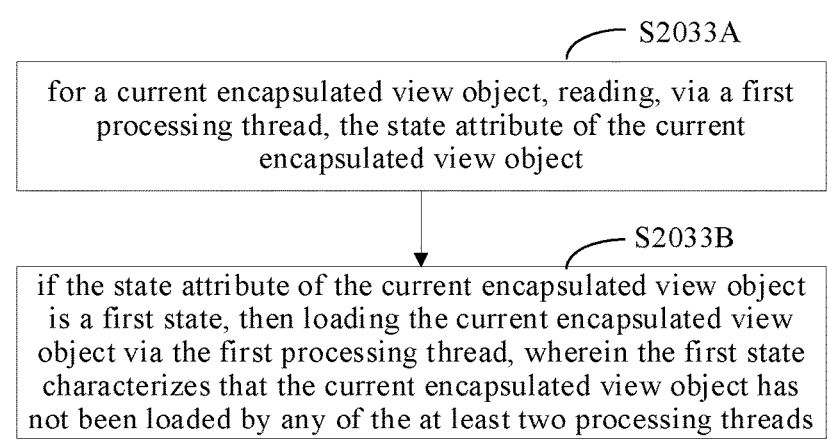

S2033A for a current encapsulated view object, reading, via a first processing thread, the state attribute of the current encapsulated view object

S2033B if the state attribute of the current encapsulated view object is a first state, then loading the current encapsulated view object via the first processing thread, wherein the first state characterizes that the current encapsulated view object has not been loaded by any of the at least two processing threads

FIG. 10

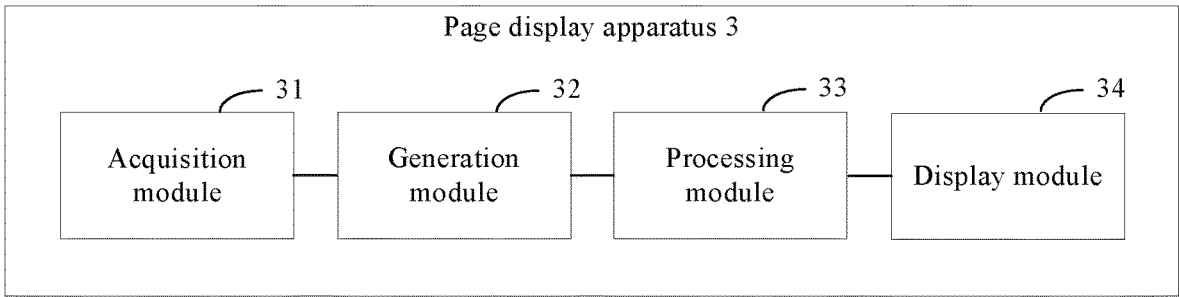

Page display apparatus 3

31

Acquisition module

32

Generation module

33

Processing module

34

Display module

FIG. 11

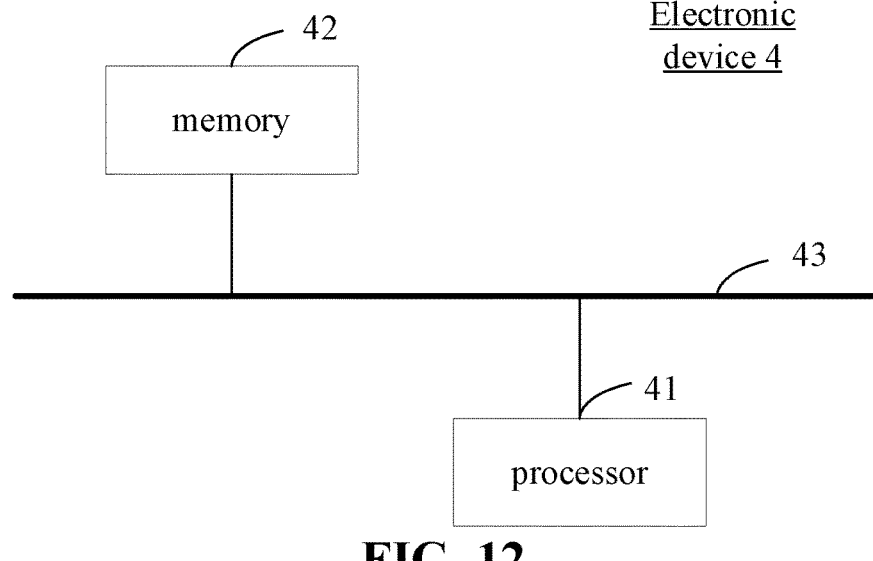

Electronic device 4

42 memory

43

41 processor

FIG. 12

PAGE DISPLAY METHOD, APPARATUS, ELECTRONIC DEVICE AND STORAGE MEDIUM

CROSS-REFERENCE TO RELATED APPLICATIONS

This application claims benefit of and is based on a Chinese Patent Application No. 202310332554.0, filed Mar. 30, 2023 entitled as "PAGE DISPLAY METHOD, APPARATUS, ELECTRONIC DEVICE AND STORAGE MEDIUM", the aforementioned application is hereby incorporated by reference in its entireties.

FIELD OF THE INVENTION

Embodiments of the present disclosure relate to the field of computer technology and, in particular, to page display method, apparatus, electronic device, and storage medium.

BACKGROUND

Under the Android operating system, a page layout of a program page in an application (APP) can be described by a layout file. In the prior art, in the process of running the application, the layout file is usually directly converted to a ViewTree through an interface provided by the operating system, and then the program page is rendered and displayed based on the ViewTree.

DISCLOSURE OF THE INVENTION

In a first aspect, embodiments of the present disclosure provide a page display method comprising:

acquiring a layout file of a target page, which is used to characterize a page layout of the target page; according to the layout file, obtaining view data of the target page, which is used to characterize view attributes of view objects within the target page; asynchronously generating a target view tree corresponding to the target page via at least two processing threads based on the view data; and displaying the target page based on the target view tree.

In a second aspect, embodiments of the present disclosure provide a page display apparatus comprising:

acquisition module configured to acquire a layout file of a target page, which is used to characterize a page layout of the target page; generation module configured to, according to the layout file, obtain view data of the target page, which is used to characterize view attributes of view objects within the target page; processing module configured to asynchronously generate a target view tree corresponding to the target page via at least two processing threads based on the view data; and display module configured to display the target page based on the target view tree.

In a third aspect, embodiments of the present disclosure provide an electronic device comprising: a processor, and a memory communicatively connected to the processor;

wherein the memory stores computer executable instructions;

wherein the processor executes the computer-executable instructions stored in the memory to implement the page display method as described in the first aspect above and in various possible designs of the first aspect.

In a fourth aspect, embodiments of the present disclosure provide a computer-readable storage medium having computer-executable instructions stored therein, wherein the processor executes the computer-executable instructions to implement the page display method as described in the first aspect above and in various possible designs of the first aspect.

In a fifth aspect, embodiments of the present disclosure provide a computer program product comprising a computer program which, when executed by a processor, implements the page display method as described in the first aspect above and in various possible designs of the first aspect.

DESCRIPTION OF THE DRAWINGS

In order to more clearly illustrate the technical schemes in the embodiments of the present disclosure or in the prior art, the following will briefly introduce the accompanying drawings that need to be used in the description of the embodiments or prior art, and it will be obvious that the accompanying drawings in the following description are some of the embodiments of the present disclosure, and for those ordinary skilled in the field, other accompanying drawings can be obtained based on these drawings without paying creative works.

FIG. 1 shows a diagram of an application scenario of a page display/loading method according to an embodiment of the present disclosure;

FIG. 2 shows a first flow chart of a page display method according to an embodiment of the present disclosure;

FIG. 3 shows a schematic structure diagram of an encapsulated view tree according to an embodiment of the present disclosure;

FIG. 4 shows a flowchart of a specific implementation of step S102 in the embodiment shown in FIG. 2;

FIG. 5 shows a flowchart of a specific implementation of step S1022 in the embodiment shown in FIG. 4;

FIG. 6 shows a schematic diagram of generating a target view tree according to an embodiment of the present disclosure;

FIG. 7 shows a second flow chart of a page display method according to an embodiment of the present disclosure;

FIG. 10 shows a flowchart of a specific implementation of step S2033 in the embodiment shown in FIG. 9;

FIG. 11 shows a structural block diagram of a page display/loading apparatus according to an embodiment of the present disclosure;

FIG. 12 is a structural schematic diagram of an electronic device according to an embodiment of the present disclosure;

DETAILED DESCRIPTION OF PREFERRED EMBODIMENTS

Figure 8:
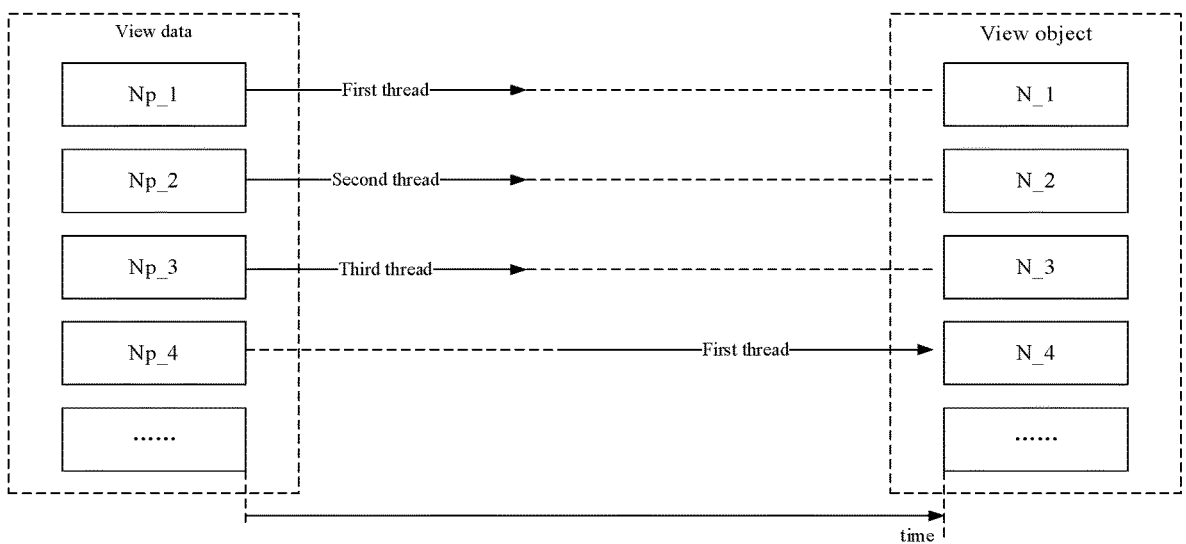
FIG. 8 shows a schematic diagram of creating a view object via multiple threads according to an embodiment of the present disclosure.

In order to make the purposes, technical solutions and advantages of the embodiments of the present disclosure clearer, the technical solutions in the embodiments of the present disclosure will be described clearly and completely in the following in connection with the accompanying drawings in the embodiments of the present disclosure, and it is clear that the described embodiments are a part of the embodiments of the present disclosure, and not all of the embodiments. Based on the embodiments in the present disclosure, all other embodiments obtained by those ordinary skilled in the art without paying creative works fall within the scope of protection of the present disclosure.

It should be noted that the user information (including, but not limited to, user device information, user personal information, etc.) and data (including, but not limited to, data used for analysis, stored data, displayed data, etc.) involved in the present disclosure all are information and data authorized by the user or sufficiently authorized by all parties, and the collection, usage, and processing of the relevant data are required to comply with relevant laws and regulations and standards of the relevant countries and regions, and a corresponding operation portal is provided for the user to choose to authorize or reject.

Application scenarios of embodiments of the present disclosure are explained below:

FIG. 1 shows a diagram of an application scenario of the page display method according to embodiments of the present disclosure, and the page display method according to embodiments of the present disclosure can be applied in scenarios of application development and testing, and application running. Specifically, as shown in FIG. 1, the method according to an embodiment of the present disclosure can be applied to a target terminal device, for example, a personal computer. As shown in the figure, a program developer designs a page layout in an application program (APP) based on specific requirements for the program development to generate a layout file (e.g., an Extensible Markup Language file) characterizing a page layout, thereafter, the development terminal device compiles the layout file together with other data and files used to implement functions of the application to generate an installation package for the application (including, for example, configuration files, executable files, library files, etc. of the application), and sends the installation package to the server for the target terminal device (the other user) to download, install, and run. In the process of running the application on the target terminal device, when a page layout needs to be loaded, the layout file in the installation package is read, and a page loading is performed on the target page based on the page layout characterized by the layout file to realize the display of the target page. Of course, in other possible implementations, the installation package may contain a code program obtained after compiling the layout file. In another possible implementation, the above process of generating the installation package for the target program may also be executed on the server side, where the server, after receiving necessary input data and instructions, executes the installation package for the application as generated above, and the other process steps are similar and will not be repeated.

However, in the method of displaying a program page in the prior art, there exits problems such as slow display speed, poor display fluency, etc. . . . In the prior art, taking the Android operating system as an example, in the process of running an application, the layout file is usually directly converted into a view tree (ViewTree) containing a plurality of view objects (View) through an interface provided by the operating system, such as the LayoutInflater API, and then the program page is rendered and displayed based on the view tree. However, in the process of generating the view tree mentioned above, the interface provided by the operating system parses the layout file via a single thread and generates the corresponding view tree. Therefore, when the content in the layout file is large and the number of view objects involved is large, the scheme of generating the view tree through a single thread by using interface provided by the system will result in an increase in the time consumed, which will lead to problems such as a slow display speed, poor display fluency of the target page and other problems.

In view of this, embodiments of the present disclosure provide a page display method, a page display apparatus, an electronic device, and a storage medium to overcome the problems such as slow display speed, poor display fluency, etc. in the prior art.

Referring to FIG. 2, which shows a first flow chart of a page display method according to an embodiment of the present disclosure. The method of the present embodiment may be applied in a terminal device, and the page display method comprises:

Step S101: acquiring a layout file of a target page, which is used to characterize a page layout of the target page.

For the terminal device side running an application, such as live APP, short video APP, instant messaging APP, etc., the target page refers to a certain specific program page in the application, such as the home page, the live page and so on. The page layout of the target page can be represented by a plurality of view objects (View). Specifically, a view object may correspond to a visual region on the screen, which is responsible for displaying an region and responding to events in the region, usually such as TextView, ImageView, Button, and Linearlayout, RelativeLayout, etc., furthermore, the view object has view attributes, which is used to characterize, for example, information about the view object such as style, size, location, etc., a specific implementation of the view data may correspond to a specific type of the view object, which will be no longer described. Among them, the view data of the view object is recorded in the layout file of the target page, so that the description for the page layout of the target page can be realized through the layout file.

Further, the layout file can be, for example, an Extensible Markup Language (XML) file, wherein an application can include a plurality of program pages for implementing different functions, and each program page corresponds to a different page layout, and thus, each program page may correspond to a layout file respectively. Of course, in other possible implementations, it is also possible to describe the layouts of all program pages in an application through a layout file, and classify the page layouts of different program pages through the specific content format in the layout file.

Step S102: according to the layout file, obtaining view data of the target page, wherein the view data is used to characterize view attributes of view objects within the target page.

Exemplarily, after the layout file corresponding to the target page is obtained, the layout file is parsed so that information contained in the layout file for characterizing the page layout of the target page can be obtained. Where, for example, the layout file contains view attributes of view objects corresponding to the target page, and after the layout file is parsed, the view attribute of each view object is obtained, thereafter, the view attribute of each view object is separately encapsulated to obtain a data set capable of characterizing the view attributes of respective view object within the target page, i.e., view data. Among them, the specific data format of the video data may be various, such as a structural format.

In one possible implementation, the view data comprises an encapsulated view tree which has the same tree structure as the target view tree, the encapsulated view tree comprises at least two encapsulated view objects therein, and an encapsulated view object is used for storing view attributes of a view object at a corresponding position on the target view tree. Exemplarily, the encapsulated view tree is a tree structure consisting of the encapsulated view objects, the tree structure to which the encapsulated view tree corresponds is a hierarchical nested structure, i.e., the outer layer (parent node) and the inner layer (child node) of the encapsulated view tree have a similar structure, and the encapsulated view tree can be expressed in a recursive manner. Furthermore, each tree node in the encapsulated view tree is an encapsulated view object, and the encapsulated view object is an encapsulation for the view attributes of the view object characterized in the layout file, and the encapsulated view object contains the view attributes of the view object at the corresponding position. FIG. 3 is a structural schematic diagram of an encapsulated view tree provided by an embodiment of the present disclosure, as shown in FIG. 3, the encapsulated view tree is a tree structure with 4 nodes (Node), and each node is an encapsulated view object. As shown in the figure, the four encapsulated view objects are encapsulated view object Np_1, encapsulated view object Np_2, encapsulated view object Np_3, and encapsulated view object Np_4 (shown as Np_1, Np_2, Np_3, and Np_4 in the figure, respectively). Among them, each encapsulated view object corresponds to a view object and stores the view attributes of the corresponding view object, for example, as shown in the figure, the encapsulated view object Np_1 corresponds to the view object N_1, the encapsulated view object Np_2 corresponds to the view object N_2, the encapsulated view object Np_3 corresponds to the view object N_3, the encapsulated view object Np_4 corresponds to the view object N_4; wherein the view object N_1, view object N_2, view object N_3 and view object N_4 constitute the target view tree.

Further, since the encapsulated view tree is generated based on the layout file, the encapsulated view tree has the same tree structure as the target view tree (in the prior art) generated directly through the layout file. The step in the present embodiment is equivalent to parsing and splitting the layout file into a custom format of data, i.e., view data, which contains all the information in the layout file, and more specifically, the view data is used to store hierarchical relationships between view objects by means of an encapsulated view tree, and view attributes corresponding to view objects are stored by means of encapsulated view objects constituting the encapsulated view tree, so that a characterization of all the information in the layout file can be implemented.

In one possible implementation, as shown in FIG. 4, a specific implementation of step S102 includes:

Step S1021: acquiring a parsing tool corresponding to the layout file.

Step S1022: based on the parsing tool, performing file compiling on the layout file to obtain the view data of each view object.

Exemplarily, after obtaining the layout file, the terminal device may determine a corresponding target parsing tool based on the format of the layout file and the current operating system, for example, under the Android operating system, the layout file can be an Extensible Markup Language (XML) file, and the Android compiling and packaging tool appt or appt2 may be selected as the parsing tool to compile the layout file. Among them, the specific implementation principle and usage method of the Android compiling and packaging tool appt or appt2 are existing techniques known to those skilled in the art and will not be repeated herein.

Afterwards, the layout file is compiled by running the parsing tool to generate program codes, which then are assembled in accordance with a specific data format, so that the view data in the data format shown in FIG. 3 above can be obtained. Exemplarily, as shown in FIG. 5, a specific implementation of step S1022 includes:

Step S1022A: based on the parsing tool, the layout file is converted to layout codes.

Step S1022B: a mapping identifier corresponding to the layout codes is created, and the mapping identifier is used to indicate the target page.

Step S1022C: based on the layout codes and the corresponding mapping identifier, the view data of the target page is obtained.

Exemplarily, based on the above introduction, for example, by compiling the layout file based on the Android compiling and packaging tool, the corresponding layout code can be obtained, in which the layout code can be in form of program codes (such as Java Code) to represent the view attributes of respective view objects corresponding to the target page, and the process of obtaining the layout code will not be repeated. Afterwards, a corresponding mapping identifier is generated for the layout code, and the mapping identifier is used to index the layout code corresponding to the target page. After that, the view data is composed based on the combination of the layout code and the corresponding mapping identifier.

Step S103: asynchronously generating a target view tree corresponding to the target page via at least two processing threads based on the view data.

Exemplarily, after the view data is obtained, based on the special data structure that the view data has, the view data can be processed via multiple threads, specifically, the view data is a class, comprising a first attribute, a first method, and a second method, wherein the first attribute is used to store an encapsulated view tree, the first method is used to generate a corresponding view object based on the encapsulated view tree; and the second method is used to splice the view objects to generate a final target view tree. FIG. 6 shows a schematic diagram of generating a target view tree according to an embodiment of the present disclosure, as shown in FIG. 6, after a layout file is obtained, the layout file is converted into view data, wherein the view data includes a first attribute View_Attr, and a first method create_View ( ) and a second method build_ViewTree ( ) Afterward, the terminal device, based on the view data, calls the first method create_View ( ) to create, via the first attribute View_Attr, a view object View_1, a view object View_2, and a view object View_3 (View_1, View_2, and View_3 are shown in the figure). Afterwards, the terminal device calls the second method build ViewTree ( ) to splice the view object View_1, the view object View_2 and the view object View_3 to generate the target view tree.

Step S104: Displaying the target page based on the target view tree.

Exemplarily, thereafter, view rendering can be performed by means of the target view tree created in the above step so that the display of the contents in the target page can be implemented. Among them, the specific implementation principles and methods of displaying the contents in the target page based on the view tree are existing techniques under the Android operating system and will not be repeated herein.

In this embodiment, acquiring a layout file of a target page, which is used to characterize a page layout of the target page; according to the layout file, obtaining view data of the target page, which is used to characterize view attributes of view objects within the target page; based on the view data, asynchronously generating a target view tree corresponding to the target page via at least two processing threads; and displaying the target page based on the target view tree. By converting the layout file into view data that can be processed asynchronously via multiple threads, and then processing the view data via multiple threads to generate the target view tree corresponding to the target page, the display of the target page can be finally implemented based on the target view tree. It avoids a problem that only single-thread processing of layout files can be performed due to directly calling a system interface, thus improving the speed of generating the target view tree and the speed of displaying the target page.

Referring to FIG. 7, FIG. 7 shows a second flow diagram of a page display method according to an embodiment of the present disclosure. The present embodiment further refines step S103 on the basis of the embodiment shown in FIG. 2, and the page display method comprises:

Step S201: acquiring a layout file of a target page, which is used to characterize a page layout of the target page.

Step S202: according to the layout file, obtaining view data of the target page, which includes an encapsulated view tree having the same tree structure as that of the target view tree, the encapsulated view tree includes at least two encapsulated view objects, and the encapsulated view object is used to store view attributes of a view object at a corresponding position on the target view tree.

Exemplarily, the view data is data having a specific data structure, the view data includes a encapsulated view tree, the encapsulated view tree has the same tree structure as the target view tree, that is, the hierarchical relationship between the encapsulated view objects in the encapsulated view tree is the same as the hierarchical relationship between the view objects in the target page, the encapsulated view tree is obtained by parsing and compiling the layout file, and, more specifically, after the layout file is parsed, the view attributes characterizing the view objects therein are converted to binary data, and then encapsulation can be performed based on the binary data corresponding to each view object to obtain an encapsulated view object, and based on the encapsulated view objects, the view data is obtained. The specific implementation can refer to the embodiment shown in FIG. 2, and will not be repeated here.

Step S203: asynchronously loading each encapsulated view object in the encapsulated view tree and creating a corresponding view object through at least two processing threads.

Exemplarily, after the view data has been obtained, the view data includes an encapsulated view tree comprised of a plurality of encapsulated view objects, wherein the encapsulated view objects are relatively separate individuals, and thus multi-thread asynchronous processing can be performed so that the corresponding view objects can be created. FIG. 8 is a schematic diagram of a multi-thread creation of view objects according to an embodiment of the present disclosure, as shown in FIG. 8, after the view data has been obtained, the view data includes a plurality of encapsulated view objects, such as the encapsulated view object Np_1, the encapsulated view object Np_2, the encapsulated view object Np_3, and the encapsulated view object Np_4. After that, a first method for the view data is invoked (particularly referring to the relevant introduction under step S103 in the embodiment as shown in FIG. 2) to create the view object corresponding to each encapsulated view object, such process may be realized asynchronously through multiple threads, for example, as shown in the figure, a first thread creates the view object N_1 corresponding to the encapsulated view object Np_1, a second thread creates the view object N_2 corresponding to the encapsulated view object Np_2, and a third thread creates the view object N_3 corresponding to the encapsulated view object Np_3. After the first thread creates view object N_1, the first thread is then utilized to create view object N_4 corresponding to encapsulated view object Np_4. In the above view object creation process, the first thread, the second thread, and the third thread can be asynchronous, and thus, compared with the scheme step of sequentially creating the view objects via a single thread in the prior art, it drastically reduces the time-consuming and improves the process of generating the target view tree, thereby improving the speed of loading and displaying the target page.

Figure 9:
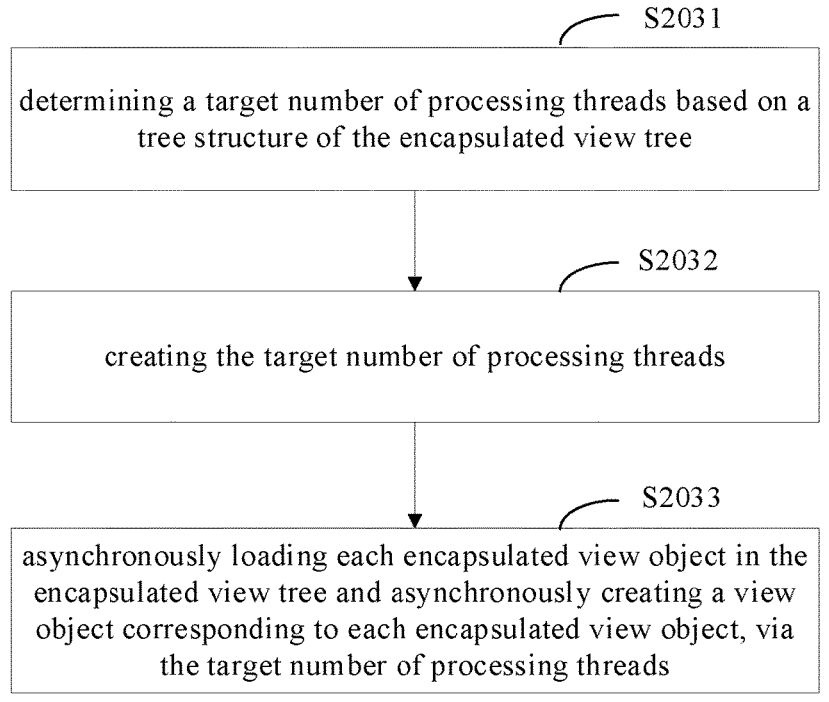
FIG. 9 shows a flowchart of a specific implementation of step S203 in the embodiment shown in FIG. 7.

Exemplarily, as shown in FIG. 9, a specific implementation of step S203 includes:

Step S2031: determining a target number of processing threads based on a tree structure of the encapsulated view tree.

In one possible implementation, the processing threads used in the multi-thread processing of the encapsulated view tree may be dynamically created, specifically, that is, based on the tree structure of the encapsulated view tree, the corresponding target number of processing threads may be determined. Among them, for example, the corresponding target number of processing threads may be determined based on the number of branches, the number of nodes in the tree structure of the encapsulated view tree, in short, when the structure of the encapsulated view tree (the view data) is simple and the amount of information contained therein is small, fewer processing threads are intended to be utilized for the processing, so as to improve the utilization rate of the system resources; whereas when the structure of the encapsulated view tree (the view data) is complex and the amount of information contained therein is large, more processing threads are intended to be utilized for the processing, so as to improve the speed of generating the target view tree.

Exemplarily, an encapsulated view object has a parent view attribute and/or a child view attribute, the parent view attribute characterizes the encapsulated view object corresponding to at least one parent encapsulated view object; and the child view attribute characterizes the encapsulated view object corresponding to at least one child encapsulated view object. Prior to step S2031, it further includes determining a tree structure of the encapsulated view tree based on parent view attributes and/or child view attributes of the encapsulated view tree. Among them, the tree structure of the encapsulated view tree characterizes the hierarchical relationship among the encapsulated view objects in the encapsulated view tree, and reference may be made to the structural schematic diagram of the encapsulated view tree as shown in FIG. 3. Exemplarily, similar to the encapsulated view tree, an encapsulated view object in the encapsulated view tree is a data object generated by means of a specific class, which has a calling scheme capable of acquiring the corresponding parent view attributes, child view attributes, and by means of the above predetermined calling scheme of the encapsulated view object, the corresponding parent view attributes, child view attributes can be acquired, and in turn, information characterizing the hierarchical relationship among the encapsulated view objects, i.e., the tree structure of the encapsulated view tree, can be obtained.

Step S2032: creating the target number of processing threads.

Step S2033: asynchronously loading each encapsulated view object in the encapsulated view tree and asynchronously creating a view object corresponding to each encapsulated view object, via the target number of processing threads.

Exemplarily, thereafter, based on the target number determined in the previous step, the target number of corresponding processing threads are created, and based on the target number of processing threads, each encapsulated view object in the encapsulated view tree is asynchronously loaded, and a view object corresponding to the encapsulated view object is asynchronously created. Among them, a specific control manner of a processing thread can be automatically accomplished by the operating system, and the control manner of the processing thread may be different under different operating systems, so it is not specifically described herein.

Furthermore, exemplarily, the encapsulated view object has a state attribute, and the state attribute is used to characterize whether or not the encapsulated view object is loaded by a processing thread; the at least two processing threads include a first processing thread, as shown in FIG. 10, and the specific implementation of step S2033 includes:

Step S2033A: for a current encapsulated view object, reading, via a first processing thread, the state attribute of the current encapsulated view object;

Step S2033B: if the state attribute of the current encapsulated view object is a first state, then loading the current encapsulated view object via the first processing thread, wherein the first state characterizes that the current encapsulated view object has not been loaded by any of the at least two processing threads.

Exemplarily, similar to the parent view attribute and child view attribute of the encapsulated view object, the encapsulated view object may also have a state attribute, and in one possible implementation, the attribute value of the state attribute may be 0 or 1, wherein when the attribute value of the state attribute is 0, the state attribute is a first state, which characterizes that the encapsulated view object has not been loaded by any of the target number of processing threads, and when the attribute value of the state attribute is 1, the state attribute is a second state, which characterizes that the encapsulated view object has been loaded by any of the target number of processing threads. Specifically, the encapsulated view tree includes a plurality of encapsulated view objects, and in the process of recursion of encapsulated view objects in the encapsulated view tree, a plurality of processing threads are used to carry out processing asynchronously, wherein, when a first processing thread therein proceeds to the current encapsulated view object (e.g., an encapsulated view object identified as Np_1 in the encapsulated view tree), the first processing thread first acquires and judges the state attribute of the current encapsulated view object, if the state attribute of the current encapsulated view object is the first state, it means that the current encapsulated view object has not been processed by other processing threads, then the first processing thread loads the current encapsulated view object; if the state attribute of the current encapsulated view object is the second state, it means that the current encapsulated view object has been processed by other processing threads, then the first processing thread ends the processing of the current encapsulated view object and jumps to the next encapsulated view object; thereby avoiding that in the case of asynchronous multi-thread processing, the encapsulated view object is processed duplicately, resulting in an error in generating the target view tree.

Step S204: After all encapsulated view objects in the encapsulated view tree have been loaded, based on the tree structure of the encapsulated view tree, the view objects corresponding to the respective encapsulated view objects are spliced together into a target view tree.

Further, after the encapsulated view objects in the encapsulated view tree are all loaded through a plurality of asynchronous processing threads, they can be spliced based on the tree structure of the encapsulated view tree to obtain a target view tree, wherein the tree structure of the encapsulated view tree is the information generated from the layout file, which may be preset in the encapsulated view tree, or may be preset in other attributes of the view data, which is not described in detail here, in a possible implementation, the view data has a preset second calling method, through which the tree structure of the encapsulated view tree can be obtained, and based on the tree structure of the encapsulated view tree, the view objects corresponding to respective encapsulated view objects can be spliced into the target view tree. The specific implementation may be referred to the relevant introduction under step S103 in the embodiment as shown in FIG. 2.

Step S205: displaying the target page based on the target view tree.

Afterwards, the terminal device performs rendering based on the target view tree to implement the display of the target page. In this embodiment, the layout file is converted into view data instead of a view tree. By means of the encapsulated view object of the encapsulated view tree in the view data containing the view attributes of each view object used to create the target view tree, it can realize separation of the creation of the view object from the creation of the view tree, and then the view objects are created through a plurality of threads and then spliced together to form the target view tree, thereby improving the overall loading speed of the target page.

In this embodiment, the specific implementation of step S201, step S202, and step S205 is consistent with that of step S101, step S102, and step S104 in the embodiment shown in FIG. 2 above, and for a detailed discussion, please refer to the discussion under the corresponding steps in the embodiment shown in FIG. 2, which will not be repeated here.

Corresponding to the page display method of the above embodiment, FIG. 11 shows a structural block diagram of a page display apparatus according to an embodiment of the present disclosure. For ease of illustration, only portions relevant to the present embodiment of the present disclosure are shown. Referring to FIG. 11, the page display apparatus 3 comprises:

acquisition module 31, configured to acquire a layout file of a target page, which is used to characterize a page layout of the target page;

generation module 32, configured to, according to the layout file, obtain view data of the target page, which is used to characterize view attributes of view objects within the target page;

processing module 33, configured to asynchronously generate a target view tree corresponding to the target page via at least two processing threads based on the view data; and display module 34, configured to display the target page based on the target view tree.

In an embodiment of the present disclosure, the view data comprises an encapsulated view tree, the encapsulated view tree having the same tree structure as the target view tree, the encapsulated view tree comprising at least two encapsulated view objects, the encapsulated view object being used to store view attributes of a view object at a corresponding position on the target view tree.

In an embodiment of the present disclosure, in asynchronously generating a target view tree corresponding to the target page via at least two processing threads based on the view data, the processing module 33 is specifically configured to: asynchronously load each encapsulated view object in the encapsulated view tree and create a corresponding view object via at least two processing threads; after all of the encapsulated view objects in the encapsulated view tree have been loaded, based on the tree structure of the encapsulated view tree, splice the view objects corresponding to respective encapsulated view objects together into a target view tree.

In an embodiment of the present disclosure, in asynchronously loading each encapsulated view object in the encapsulated view tree and creating a corresponding view object via at least two processing threads, the processing module 33 is specifically configured to: determine a target number of processing threads based on a tree structure of the encapsulated view tree; create the target number of processing threads; and asynchronously load each encapsulated view object in the encapsulated view tree and create a view object corresponding to the encapsulated view object via the target number of processing threads.

In an embodiment of the present disclosure, the encapsulated view object has a parent view attribute and/or a child view attribute, wherein the parent view attribute is used to characterize the encapsulated view object corresponding to at least one parent encapsulated view object; and the child view attribute is used to characterize the encapsulated view object corresponding to at least one child encapsulated view object; and the processing module 33 is further configured to: determine a tree structure of the encapsulated view tree based on parent view attributes and/or child view attributes of the encapsulated view tree.

In an embodiment of the present disclosure, the encapsulated view object has a state attribute, the state attribute being used to characterize whether or not the encapsulated view object is loaded by a processing thread; wherein the at least two processing threads include a first processing thread, the processing module 33, in asynchronously loading each encapsulated view object in the encapsulated view tree via at least two processing threads, is specifically configured to: for a current encapsulated view object, read, via a first processing thread, the state attribute of the current encapsulated view object; if the state attribute of the current encapsulated view object is a first state, then load the current encapsulated view object via the first processing thread, wherein the first state characterizes that the current encapsulated view object has not been loaded by any of the at least two processing threads.

In an embodiment of the present disclosure, the layout file is an Extensible Markup Language file, and the generation module 32, in obtaining view data of the target page according to the layout file, is specifically configured to: acquire a parsing tool corresponding to the layout file; perform fie compiling on the layout file based on the parsing tool, to obtain view data of the target page.

In an embodiment of the present disclosure, the generation module 32, in performing fie compiling on the layout file based on the parsing tool, to obtain view data of the target page, is specifically configured to: convert the layout file into layout codes based on the parsing tool; create a mapping identifier corresponding to the layout codes, wherein the mapping identifier is used to indicate the target page; and based on the layout codes and the corresponding mapping identifier, obtain view data of the target page.

Among them, the acquisition module 31, the generation module 32, the processing module 33, and the display module 34 are connected sequentially. The page display apparatus 3 provided in this embodiment can perform the technical solutions of the above method embodiments, and have the similar implementation principle and technical effect, and this embodiment will not be described in detail herein.

FIG. 12 shows a structural schematic diagram of an electronic device according to an embodiment of the present disclosure, as shown in FIG. 12, the electronic device 4 comprises:

processor 41, and a memory 42 communicatively coupled to the processor 41;

Memory 42 stores computer executable instructions;

The processor 41 executes computer-executable instructions stored in the memory 42 to implement the page display method in the embodiments shown in FIG. 2-FIG. 10.

Among them, optionally, the processor 41 and the memory 42 are connected via a bus 43.

The relevant description can be understood with reference to the relevant description and effects corresponding to the steps in the embodiments corresponding to FIG. 2-FIG. 10, which will not be repeated herein.

Embodiments of the present disclosure provide a computer-readable storage medium, the computer-readable storage medium having stored therein computer-executable instructions, the computer-executable instructions, when executed by a processor, implement the page display method provided in any of the embodiments corresponding to FIGS. 2-FIG. 10 of the present disclosure.

Embodiments of the present disclosure provide a computer program product comprising a computer program that, when executed by a processor, implements the page display method as in the embodiments shown in FIGS. 2-FIG. 10.

Figure 13:
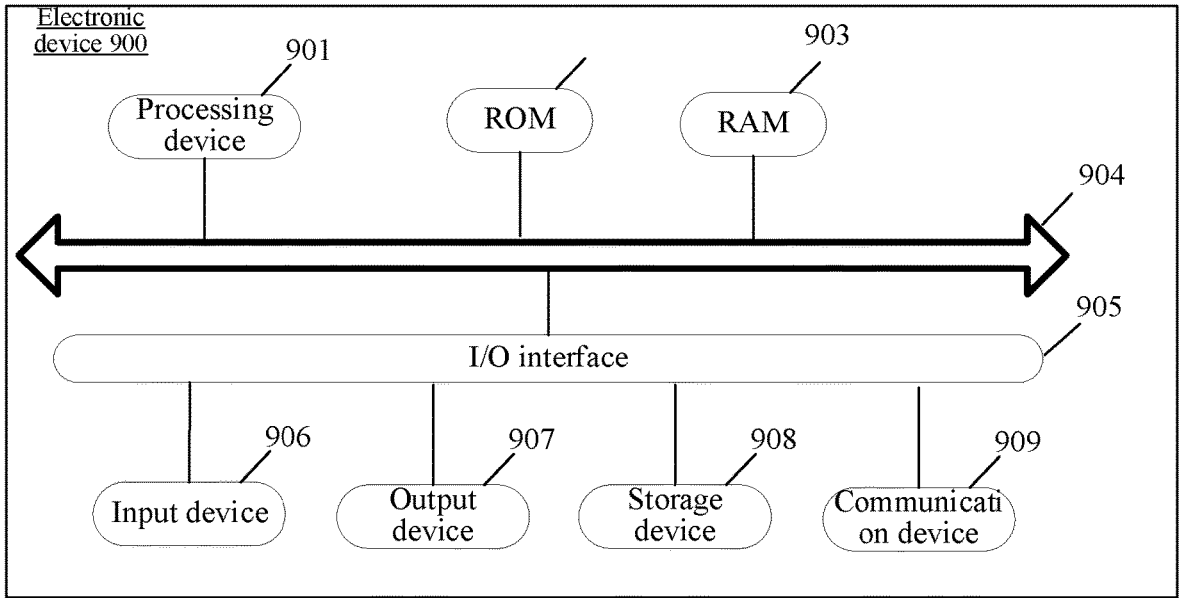
FIG. 13 shows a schematic diagram of a hardware structure of an electronic device according to an embodiment of the present disclosure.

Referring to FIG. 13, which illustrates a structural schematic diagram of an electronic device 900 suitable for implementing embodiments of the present disclosure, the electronic device 900 may be a terminal device or a server. Among other things, the terminal device may include, but not limited to, mobile devices such as a cell phone, a laptop computer, a digital broadcast receiver, a Personal Digital Assistant (PDA), a Portable Android Device (PAD), a Portable Multimedia Player (PMP), an in-vehicle terminal (e.g., a vehicle-mounted navigation terminal), and the like, and fixed terminals such as digital TVs, desktop computers, and the like. The electronic device illustrated in FIG. 13 is merely an example and should not impose any limitation on the functions and usage scopes of the embodiments of the present disclosure.

As shown in FIG. 13, the electronic device 900 may include a processing device (e.g., a central processor, a graphics processor, etc.) 901 that may perform various appropriate actions and processes based on a program stored in a Read Only Memory ("ROM") 902 or loaded from a storage device 908 into a Random Access Memory ("RAM") 903. Also stored in the RAM 903 are various programs and data necessary for the operation of the electronic device 900. The processing device 901, the ROM 902, and the RAM 903 are connected to each other via a bus 904. Input/output (I/O) interfaces 905 are also connected to the bus 904.

Typically, the following devices may be connected to the I/O interface 905: an input device 906 including, for example, a touch screen, a touch pad, a keyboard, a mouse, a camera, a microphone, an accelerometer, a gyroscope, and the like; an output device 907 including, for example, a Liquid Crystal Display (LCD), a speaker, a vibrator, and the like; a storage device 908 including, for example, a magnetic tape, a hard disk, and the like; and a communication device 909. The communication device 909 may allow the electronic device 900 to communicate with other devices wirelessly or wiredly to exchange data. Although FIG. 13 illustrates electronic device 900 with various devices, it should be understood that it is not required to implement or have all the illustrated devices. More or fewer devices may alternatively be implemented or possessed.

In particular, according to embodiments of the present disclosure, the process described above with reference to the flowchart may be implemented as a computer software program. For example, embodiments of the present disclosure include a computer program product comprising a computer program carried on a computer readable medium, the computer program comprising program codes for performing the method shown in the flowchart. In such embodiments, the computer program may be downloaded and installed from a network via a communication device 909, or installed from a storage device 908, or installed from a ROM 902. At the time that the computer program is executed by the processing device 901, the above-described functions defined in the methods of embodiments of the present disclosure can be performed.

It is noted that the computer-readable medium described above in the present disclosure may be a computer-readable signal medium or a computer-readable storage medium or any combination thereof. The computer-readable storage medium may, for example, be—but not limited to—a system, apparatus, or device of electricity, magnetism, light, electromagnetism, infrared, or semiconductors, or any combination of the above. More specific examples of computer-readable storage media may include, but not limited to, electrical connections having one or more wires, portable computer disks, hard disks, random access memory (RAM), read-only memory (ROM), erasable programmable read-only memory (EPROM or flash memory), optical fibers, portable compact disk read-only memories (CD-ROM), optical storage devices, magnetic memory device, or any suitable combination of the foregoing. In the context of the present disclosure, a computer-readable storage medium may be any tangible medium containing or storing a program that may be used by or in conjunction with an instruction execution system, apparatus, or device. And in the context of the present disclosure, a computer-readable signal medium may include a data signal propagated in a baseband or as part of a carrier that carries computer-readable program codes. Such propagated data signals may take a variety of forms, including, but not limited to, electromagnetic signals, optical signals, or any suitable combination of the foregoing. The computer-readable signal medium may also be any computer-readable medium other than a computer-readable storage medium, the computer-readable medium can send, propagate, or transmit a program for use by, or in conjunction with, an instruction-executing system, apparatus, or device. The program codes contained on the computer-readable medium may be transmitted by using any suitable medium, including, but not limited to, wire, fiber optic cable, RF (radio frequency), etc., or any suitable combination of the foregoing.

The computer-readable medium may be included in the electronic device; or it may be separate and not assembled into such electronic device.

The above-described computer-readable medium carries one or more programs that, when the above-described one or more programs are executed by the electronic device, cause the electronic device to execute the method shown in the above-described embodiment.

Computer program codes for performing the operations of the present disclosure may be written in one or more programming languages or combinations thereof, the programming language including object-oriented programming language—such as Java, Smalltalk, C++, and conventional procedural programming language—such as the "C" language or the like. The program codes may be executed entirely on the user's computer, partially on the user's computer, as a stand-alone software package, partially on the user's computer and partially on a remote computer, or entirely on a remote computer or server. In situations involving a remote computer, the remote computer may be connected to the user computer via any kind of network—including a Local Area Network (LAN) or a Wide Area Network (WAN)—or, alternatively, may be connected to an external computer, e.g., by using an Internet Service Provider to connect over the Internet.

The flowcharts and block diagrams in the accompanying drawings illustrate the architecture, functionality, and operation that may be implemented by systems, methods, and computer program products in accordance with various embodiments of the present disclosure. At this point, each box in the flowcharts or block diagrams may represent a module, program segment, or a portion of code that contains one or more executable instructions for implementing a specified logical function. It should also be noted that in some alternative implementations, the functions labeled in the boxes may also occur in a different order than those labeled in the accompanying drawings. For example, two consecutively represented boxes may actually be executed substantially in parallel, and they may sometimes be executed in reverse order, depending on the function involved. It should also be noted that each of the boxes in the block diagrams and/or flowcharts, and combinations of the boxes in the block diagrams and/or flowcharts, may be implemented with a dedicated hardware-based system that performs the specified function or operation, or may be implemented with a combination of the dedicated hardware and computer instructions.

The units described in the embodiments of the present disclosure may be implemented by way of software or by way of hardware. Among others, the name of the unit does not in some cases constitute a limitation of the unit itself, for example, the first acquisition unit may also be described as "a unit for acquiring at least two Internet Protocol addresses".

The functions described above herein may be performed, at least in part, by one or more hardware logic components. For example, non-limitatively, exemplary types of hardware logic components that may be used include field programmable gate arrays (FPGAs), application-specific integrated circuits (ASICs), application-specific standard products (ASSPs), systems-on-chip (SOCs), complex programmable logic devices (CPLDs), and the like.

In the context of the present disclosure, a machine-readable medium may be a tangible medium that may contain or store a program for use by or in conjunction with an instruction execution system, device, or apparatus. The machine-readable medium may be a machine-readable signal medium or a machine-readable storage medium. The machine-readable medium may include, but not limited to, an electronic, magnetic, optical, electromagnetic, infrared, or semiconductor system, device, or apparatus, or any suitable combination of the foregoing. More specific examples of machine-readable storage media would include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination of the foregoing. any suitable combination of the above.

In a first aspect, according to one or more embodiments of the present disclosure, there is provided a page display method comprising:

acquiring a layout file of a target page, which is used to characterize a page layout of the target page; according to the layout file, obtaining view data of the target page, which is used to characterize view attributes of view objects within the target page; asynchronously generating a target view tree corresponding to the target page via at least two processing threads based on the view data; and displaying the target page based on the target view tree.

According to one or more embodiments of the present disclosure, the view data comprises an encapsulated view tree, the encapsulated view tree having the same tree structure as the target view tree, the encapsulated view tree comprising at least two encapsulated view objects, the encapsulated view object being used to store view attributes of a view object at a corresponding position on the target view tree.

According to one or more embodiments of the present disclosure, the asynchronously generating a target view tree corresponding to the target page via at least two processing threads based on the view data, may include: asynchronously loading each encapsulated view object in the encapsulated view tree and creating a corresponding view object via at least two processing threads; after all of the encapsulated view objects in the encapsulated view tree have been loaded, based on the tree structure of the encapsulated view tree, splicing the view objects corresponding to respective encapsulated view objects together into a target view tree.

According to one or more embodiments of the present disclosure, the asynchronously loading each encapsulated view object in the encapsulated view tree and creating a corresponding view object via at least two processing threads, may include: determining a target number of processing threads based on a tree structure of the encapsulated view tree; creating the target number of processing threads; and asynchronously loading each encapsulated view object in the encapsulated view tree and creating a corresponding view object via the target number of processing threads.

According to one or more embodiments of the present disclosure, the encapsulated view object has a parent view attribute and/or a child view attribute, wherein the parent view attribute is used to characterize the encapsulated view object corresponding to at least one parent encapsulated view object; and the child view attribute is used to characterize the encapsulated view object corresponding to at least one child encapsulated view object; and wherein the method may further include: determining a tree structure of the encapsulated view tree based on parent view attributes and/or child view attributes of the encapsulated view tree.

According to one or more embodiments of the present disclosure, the encapsulated view object has a state attribute, the state attribute being used to characterize whether or not the encapsulated view object is loaded by a processing thread; wherein the at least two processing threads include a first processing thread, and the asynchronously loading each encapsulated view object in the encapsulated view tree via at least two processing threads, may include: for a current encapsulated view object, reading, via a first processing thread, the state attribute of the current encapsulated view object; if the state attribute of the current encapsulated view object is a first state, then loading the current encapsulated view object via the first processing thread, wherein the first state characterizes that the current encapsulated view object has not been loaded by any of the at least two processing threads.

According to one or more embodiments of the present disclosure, the layout file is an Extensible Markup Language file, and the obtaining view data of the target page according to the layout file may include: acquiring a parsing tool corresponding to the layout file; and performing fie compiling on the layout file based on the parsing tool, to obtain view data of the target page.

According to one or more embodiments of the present disclosure, the performing fie compiling on the layout file based on the parsing tool, to obtain view data of the target page, may include: converting the layout file into layout codes based on the parsing tool; creating a mapping identifier corresponding to the layout codes, wherein the mapping identifier is used to indicate the target page; and based on the layout codes and the corresponding mapping identifier, obtaining view data of the target page.

In a second aspect, according to one or more embodiments of the present disclosure, there is provided a page display apparatus comprising:

acquisition module, configured to acquire a layout file of a target page, which is used to characterize a page layout of the target page;

generation module, configured to, according to the layout file, obtain view data of the target page, which is used to characterize view attributes of view objects within the target page;

processing module, configured to asynchronously generate a target view tree corresponding to the target page via at least two processing threads based on the view data; and display module, configured to display the target page based on the target view tree.

According to one or more embodiments of the present disclosure, the view data comprises an encapsulated view tree, the encapsulated view tree having the same tree structure as the target view tree, the encapsulated view tree comprising at least two encapsulated view objects, the encapsulated view object being used to store view attributes of a view object at a corresponding position on the target view tree.

According to one or more embodiments of the present disclosure, in asynchronously generating a target view tree corresponding to the target page via at least two processing threads based on the view data, the processing module is specifically configured to: asynchronously load each encapsulated view object in the encapsulated view tree and create a corresponding view object via at least two processing threads; after all of the encapsulated view objects in the encapsulated view tree have been loaded, based on the tree structure of the encapsulated view tree, splice the view objects corresponding to respective encapsulated view objects together into a target view tree.

According to one or more embodiments of the present disclosure, in asynchronously loading each encapsulated view object in the encapsulated view tree and creating a corresponding view object via at least two processing threads, the processing module is specifically configured to: determine a target number of processing threads based on a tree structure of the encapsulated view tree; create the target number of processing threads; and asynchronously load each encapsulated view object in the encapsulated view tree and create a view object corresponding to the encapsulated view object via the target number of processing threads.

According to one or more embodiments of the present disclosure, the encapsulated view object has a parent view attribute and/or a child view attribute, wherein the parent view attribute is used to characterize the encapsulated view object corresponding to at least one parent encapsulated view object; and the child view attribute is used to characterize the encapsulated view object corresponding to at least one child encapsulated view object; and the processing module is further configured to: determine a tree structure of the encapsulated view tree based on parent view attributes and/or child view attributes of the encapsulated view tree.

According to one or more embodiments of the present disclosure, the encapsulated view object has a state attribute, the state attribute being used to characterize whether or not the encapsulated view object is loaded by a processing thread; wherein the at least two processing threads include a first processing thread, the processing module, in asynchronously loading each encapsulated view object in the encapsulated view tree via at least two processing threads, is specifically configured to: for a current encapsulated view object, read, via a first processing thread, the state attribute of the current encapsulated view object; if the state attribute of the current encapsulated view object is a first state, then load the current encapsulated view object via the first processing thread, wherein the first state characterizes that the current encapsulated view object has not been loaded by any of the at least two processing threads.

According to one or more embodiments of the present disclosure, the layout file is an Extensible Markup Language file, and the generation module, in obtaining view data of the target page according to the layout file, is specifically configured to: acquire a parsing tool corresponding to the layout file; perform fie compiling on the layout file based on the parsing tool, to obtain view data of the target page.

In an embodiment of the present disclosure, the generation module, in performing fie compiling on the layout file based on the parsing tool, to obtain view data of the target page, is specifically configured to: convert the layout file into layout codes based on the parsing tool; create a mapping identifier corresponding to the layout codes, wherein the mapping identifier is used to indicate the target page; and based on the layout codes and the corresponding mapping identifier, obtain view data of the target page.

In a third aspect, according to one or more embodiments of the present disclosure, there is provided an electronic device comprising: a processor, and a memory communicatively connected to the processor;

wherein the memory stores computer executable instructions;

wherein the processor executes the computer-executable instructions stored in the memory to implement the page display method as described in the first aspect above and in various possible designs of the first aspect.

In a fourth aspect, according to one or more embodiments of the present disclosure, there is provided a computer-readable storage medium having computer-executable instructions stored therein, wherein the processor executes the computer-executable instructions to implement the page display method as described in the first aspect above and in various possible designs of the first aspect.

In a fifth aspect, according to one or more embodiments of the present disclosure, there is provided a computer program product comprising a computer program which, when executed by a processor, implements the page display method as described in the first aspect above and in various possible designs of the first aspect.

In a sixth aspect, according to one or more embodiments of the present disclosure, there is provided a computer program comprising program codes which, when executed by a processor, implements the page display method as described in the first aspect above and in various possible designs of the first aspect.

The above description only belongs to illustration of preferred embodiments of the present disclosure and their technical principles. It should be understood by those skilled in the art that the scope of disclosure involved in the present disclosure is not limited to technical solutions formed by a particular combination of the above technical features, but also covers other technical solutions formed by any combination of the above technical features or their equivalent features without departing from the above disclosed concept, for example, a technical solution formed by interchanging the above features with (but not limited to) technical features with similar functions disclosed in the present disclosure.

Furthermore, while the operations are depicted using a particular order, this should not be construed as requiring that the operations be performed in the particular order shown or in sequential order of execution. Multi-task and parallel processing may be advantageous in certain environments. Similarly, while several specific implementation details are included in the above discussion, these should not be construed as limiting the scope of the present disclosure. Certain features described in the context of separate embodiments may also be implemented in a single embodiment in combination. Conversely, various features described in the context of a single embodiment may also be implemented in multiple embodiments, either individually or in any suitable sub-combination.

Although the present subject matter has been described using language specific to structural features and/or method logic actions, it should be understood that the subject matter limited in the appended claims is not necessarily limited to the particular features or actions as described above. Rather, the particular features and actions as described above are merely exemplary forms of implementing the claims.

The invention claimed is:

1. A page display method, comprising:

acquiring a layout file of a target page, which is used to characterize a page layout of the target page;

according to the layout file, obtaining view data of the target page, which is used to characterize view attributes of view objects within the target page;

asynchronously generating a target view tree corresponding to the target page via at least two processing threads based on the view data; and displaying the target page based on the target view tree, wherein the view data comprises an encapsulated view tree, the encapsulated view tree having the same tree structure as the target view tree, the encapsulated view tree comprising at least two encapsulated view objects, the encapsulated view object being used to store view attributes of a view object at a corresponding position on the target view tree.

2. The method of claim 1, wherein asynchronously generating a target view tree corresponding to the target page via at least two processing threads based on the view data, comprising:

asynchronously loading each encapsulated view object in the encapsulated view tree and creating a corresponding view object via at least two processing threads;

after all of the encapsulated view objects in the encapsulated view tree have been loaded, based on the tree structure of the encapsulated view tree, splicing the view objects corresponding to respective encapsulated view objects together into a target view tree.

3. The method of claim 2, wherein the asynchronously loading each encapsulated view object in the encapsulated view tree and creating a corresponding view object via at least two processing threads, comprises:

determining a target number of processing threads based on a tree structure of the encapsulated view tree;

creating the target number of processing threads;

asynchronously loading each encapsulated view object in the encapsulated view tree and creating a corresponding view object via the target number of processing threads.

4. The method of claim 2, wherein the encapsulated view object has a state attribute, the state attribute being used to characterize whether or not the encapsulated view object is loaded by a processing thread; wherein the at least two processing threads include a first processing thread, wherein the asynchronously loading each encapsulated view object in the encapsulated view tree via at least two processing threads, comprising:

for a current encapsulated view object, reading, via the first processing thread, the state attribute of the current encapsulated view object;

if the state attribute of the current encapsulated view object is a first state, then loading the current encapsulated view object via the first processing thread, wherein the first state characterizes that the current encapsulated view object has not been loaded by any of the at least two processing threads.

5. The method of claim 3, wherein the encapsulated view object has at least one of a parent view attribute or a child view attribute, wherein the parent view attribute is used to characterize the encapsulated view object corresponding to at least one parent encapsulated view object; and the child view attribute is used to characterize the encapsulated view object corresponding to at least one child encapsulated view object;

wherein the method further comprises:

determining a tree structure of the encapsulated view tree based on at least one of parent view attributes or child view attributes of the encapsulated view tree.

6. The method of claim 1, wherein the layout file is an Extensible Markup Language file, wherein the according to the layout file, obtaining view data of the target page, comprises:

acquiring a parsing tool corresponding to the layout file;

performing fie compiling on the layout file based on the parsing tool, to obtain view data of the target page.

7. The method of claim 6, wherein the performing fie compiling on the layout file based on the parsing tool, to obtain view data of the target page, comprises:

converting the layout file into layout codes based on the parsing tool;

creating a mapping identifier corresponding to the layout codes, wherein the mapping identifier is used to indicate the target page; and based on the layout codes and the corresponding mapping identifier, obtaining view data of the target page.

8. An electronic device, comprising a processor, and a memory communicatively connected to the processor;

wherein the memory stores computer executable instructions;

wherein the processor executes the computer-executable instructions stored in the memory to implement:

acquiring a layout file of a target page, which is used to characterize a page layout of the target page;

according to the layout file, obtaining view data of the target page, which is used to characterize view attributes of view objects within the target page;

asynchronously generating a target view tree corresponding to the target page via at least two processing threads based on the view data; and displaying the target page based on the target view tree, wherein the view data comprises an encapsulated view tree, the encapsulated view tree having the same tree structure as the target view tree, the encapsulated view tree comprising at least two encapsulated view objects, the encapsulated view object being used to store view attributes of a view object at a corresponding position on the target view tree.

9. The electronic device of claim 8, wherein the asynchronously generating a target view tree corresponding to the target page via at least two processing threads based on the view data, comprising:

asynchronously loading each encapsulated view object in the encapsulated view tree and creating a corresponding view object via at least two processing threads;

after all of the encapsulated view objects in the encapsulated view tree have been loaded, based on the tree structure of the encapsulated view tree, splicing the view objects corresponding to respective encapsulated view objects together into a target view tree.

10. The electronic device of claim 9, wherein the asynchronously loading each encapsulated view object in the encapsulated view tree and creating a corresponding view object via at least two processing threads, comprises:

determining a target number of processing threads based on a tree structure of the encapsulated view tree;

creating the target number of processing threads;

asynchronously loading each encapsulated view object in the encapsulated view tree and creating a corresponding view object via the target number of processing threads.

11. The electronic device of claim 9, wherein the encapsulated view object has a state attribute, the state attribute being used to characterize whether or not the encapsulated view object is loaded by a processing thread; wherein the at least two processing threads include a first processing thread, wherein the asynchronously loading each encapsulated view object in the encapsulated view tree via at least two processing threads, comprising:

for a current encapsulated view object, reading, via the first processing thread, the state attribute of the current encapsulated view object;

if the state attribute of the current encapsulated view object is a first state, then loading the current encapsulated view object via the first processing thread, wherein the first state characterizes that the current encapsulated view object has not been loaded by any of the at least two processing threads.

12. The electronic device of claim 10, wherein the encapsulated view object has at least one of a parent view attribute or a child view attribute, wherein the parent view attribute is used to characterize the encapsulated view object corresponding to at least one parent encapsulated view object; and the child view attribute is used to characterize the encapsulated view object corresponding to at least one child encapsulated view object;

wherein the processor executes the computer-executable instructions stored in the memory to further implement:

determining a tree structure of the encapsulated view tree based on at least one of parent view attributes or child view attributes of the encapsulated view tree.

13. The electronic device of claim 8, wherein the layout file is an Extensible Markup Language file, wherein the according to the layout file, obtaining view data of the target page, comprises:

acquiring a parsing tool corresponding to the layout file;

performing fie compiling on the layout file based on the parsing tool, to obtain view data of the target page.

14. A non-transitory computer-readable storage medium having computer-executable instructions stored therein, wherein the processor executes the computer- executable instructions to implement:

acquiring a layout file of a target page, which is used to characterize a page layout of the target page;

according to the layout file, obtaining view data of the target page, which is used to characterize view attributes of view objects within the target page;

asynchronously generating a target view tree corresponding to the target page via at least two processing threads based on the view data; and displaying the target page based on the target view tree, wherein the view data comprises an encapsulated view tree, the encapsulated view tree having the same tree structure as the target view tree, the encapsulated view tree comprising at least two encapsulated view objects, the encapsulated view object being used to store view attributes of a view object at a corresponding position on the target view tree.

15. The non-transitory computer-readable storage medium of claim 14, wherein the asynchronously generating a target view tree corresponding to the target page via at least two processing threads based on the view data, comprising:

asynchronously loading each encapsulated view object in the encapsulated view tree and creating a corresponding view object via at least two processing threads;

after all of the encapsulated view objects in the encapsulated view tree have been loaded, based on the tree structure of the encapsulated view tree, splicing the view objects corresponding to respective encapsulated view objects together into a target view tree.

16. The non-transitory computer-readable storage medium of claim 15, wherein the asynchronously loading each encapsulated view object in the encapsulated view tree and creating a corresponding view object via at least two processing threads, comprises:

determining a target number of processing threads based on a tree structure of the encapsulated view tree;

creating the target number of processing threads;

asynchronously loading each encapsulated view object in the encapsulated view tree and creating a corresponding view object via the target number of processing threads.

17. The non-transitory computer-readable storage medium of claim 15, wherein the encapsulated view object has a state attribute, the state attribute being used to characterize whether or not the encapsulated view object is loaded by a processing thread; wherein the at least two processing threads include a first processing thread, wherein the asynchronously loading each encapsulated view object in the encapsulated view tree via at least two processing threads, comprising:

for a current encapsulated view object, reading, via the first processing thread, the state attribute of the current encapsulated view object;

if the state attribute of the current encapsulated view object is a first state, then loading the current encapsulated view object via the first processing thread, wherein the first state characterizes that the current encapsulated view object has not been loaded by any of the at least two processing threads.

\*    \*    \*    \*    \*